Figure 1:
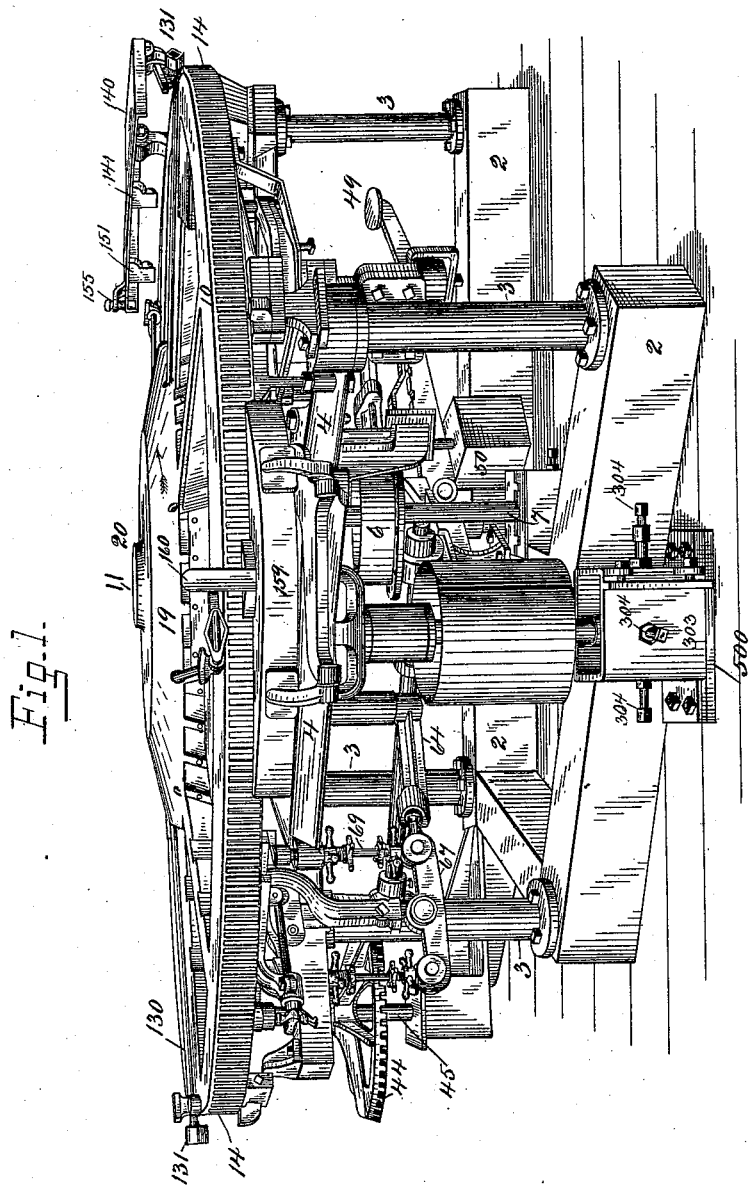

(No Model.)

W. J. PERKINS.
SHINGLE MACHINE.

No. 561,280.  Patented June 2, 1896.

Witnesses:
John G. Pepper
L. M. Bartlett

W. J. Perkins
Inventor:
By W. A. Bartlett
Attorney:

(No Model.) 11 Sheets—Sheet 3.
W. J. PERKINS.
SHINGLE MACHINE.

No. 561,280. Patented June 2, 1896.

(No Model.)                W. J. PERKINS.                11 Sheets—Sheet 4.
                           SHINGLE MACHINE.
No. 561,280.                              Patented June 2, 1896.

Witnesses:
John G. Leffer.
L. Th. Bartlett.

W. J. Perkins
Inventor:
By W. A. Bartlett
Attorney:

(No Model.) 11 Sheets—Sheet 5.

W. J. PERKINS.
SHINGLE MACHINE.

No. 561,280. Patented June 2, 1896.

Witnesses:
John G. Lepper.
L. M. Bartlett.

W. J. Perkins
Inventor:
By W. A. Bartlett
Attorney.

(No Model.) 11 Sheets—Sheet 6.
W. J. PERKINS.
SHINGLE MACHINE.

No. 561,280. Patented June 2, 1896.

Witnesses:
John G. Pepper.
L. M. Bartlett.

W. J. Perkins
Inventor:
By W. H. Bartlett
Attorney:

(No Model.)  W. J. PERKINS.  11 Sheets—Sheet 7.
SHINGLE MACHINE.
No. 561,280.  Patented June 2, 1896.
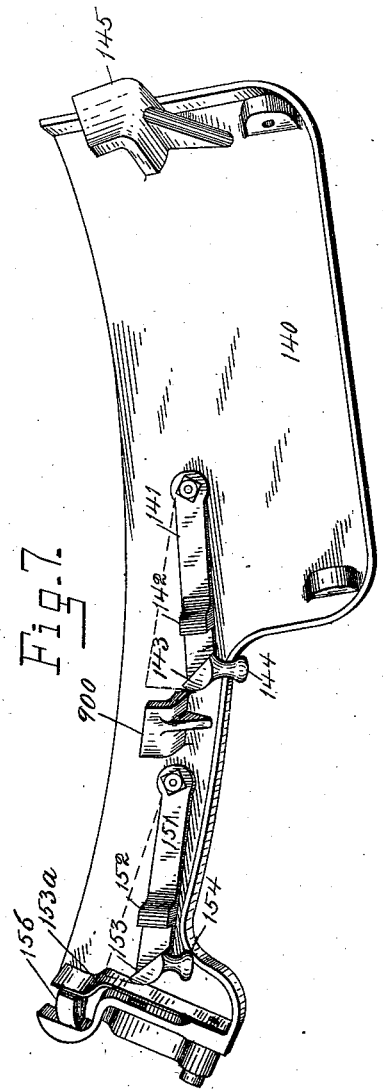
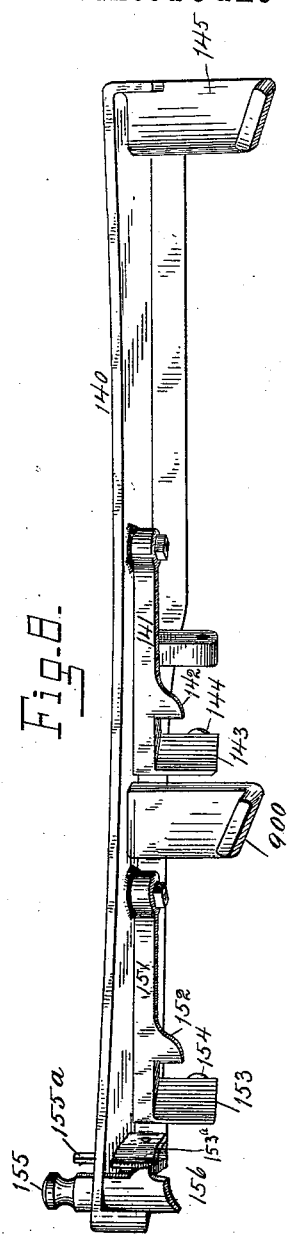
Witnesses:
John G. Zipper.
L. M. Bartlett.
W. J. Perkins
Inventor
By W. H. Bartlett
Attorney.

(No Model.)  
W. J. PERKINS.  
SHINGLE MACHINE.
No. 561,280.  Patented June 2, 1896.
11 Sheets—Sheet 8.
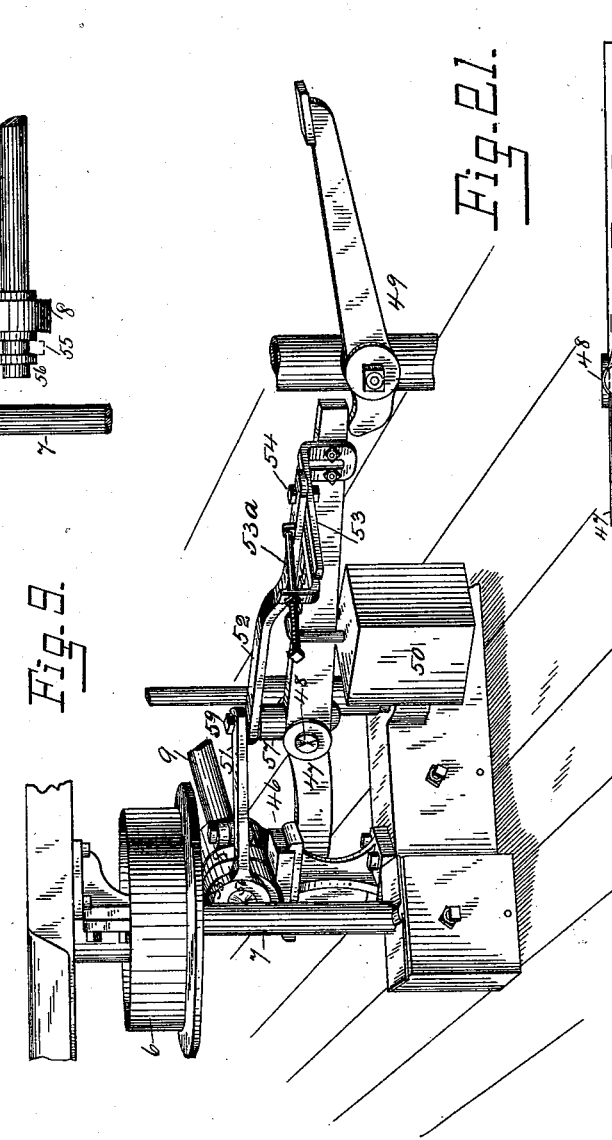

(No Model.) 11 Sheets—Sheet 9.
W. J. PERKINS.
SHINGLE MACHINE.
No. 561,280. Patented June 2, 1896.
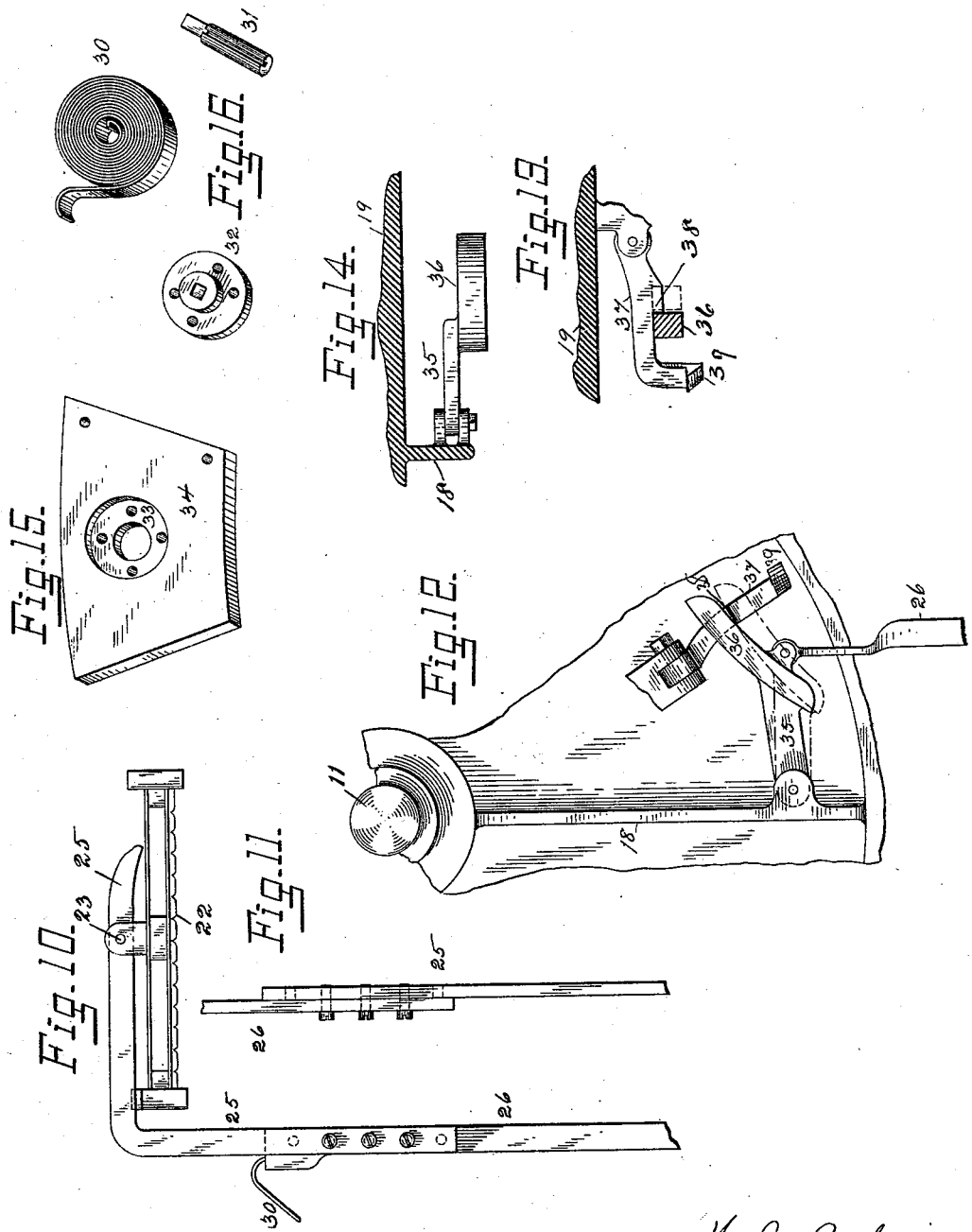

(No Model.) 11 Sheets—Sheet 10.

W. J. PERKINS.
SHINGLE MACHINE.

No. 561,280. Patented June 2, 1896.

Witnesses:
John G. Lepper.
L. M. Bartlett.

W. J. Perkins
Inventor:
By W. H. Bartlett
Attorney.

(No Model.) 11 Sheets—Sheet 11.
W. J. PERKINS.
SHINGLE MACHINE.
No. 561,280. Patented June 2, 1896.
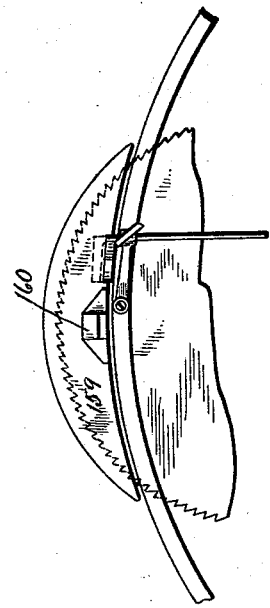
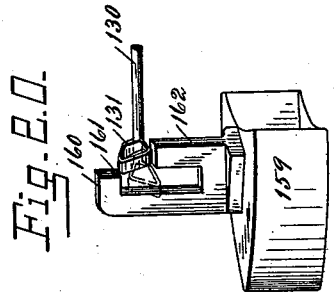
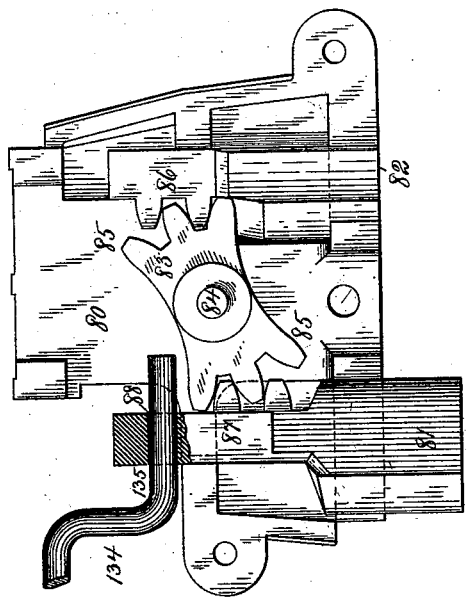
Witnesses:
John G. Pepper
L. M. Bartlett
W. J. Perkins
Inventor:
By W. A. Bartlett
Attorney:

UNITED STATES PATENT OFFICE.

WILLIS J. PERKINS, OF GRAND RAPIDS, MICHIGAN.

SHINGLE-MACHINE.

SPECIFICATION forming part of Letters Patent No. 561,280, dated June 2, 1896.

Application filed January 28, 1890. Serial No. 338,340. (No model.)

*To all whom it may concern:*

Be it known that I, WILLIS J. PERKINS, residing at Grand Rapids, in the county of Kent and State of Michigan, have invented certain new and useful Improvements in Shingle-Machines, of which the following is a specification, reference being had therein to the accompanying drawings.

This invention relates to machines for sawing shingles, of the general character in which a plurality of shingle bolts or blocks are carried successively to a saw or series of saws, and the shingles sawed from the lower portion of the blocks or bolts.

The object of the invention is to improve the frame and render the entire structure more compact; to improve the carriage-driving and spalt-regulating mechanism and place it conveniently under control of the operator; to improve the carriage and place certain of the operative parts well in the center of the machine, where they are covered, protected from sawdust, and out of the way in using; to improve the dogging mechanism and to inclose certain parts thereof; to improve the tilting devices which determine the thickness of the butts and points of the shingles and the spalting apparatus which drops the refuse from the machine; to make the entire machine, to a great extent, automatic, leaving the operator little to do but watch the machine and move certain handles, pins, catches, or stops into abnormal positions, when the further operation of the machine, under the influence of these handles, pins, catches, or stops, will be automatic, and, finally, to improve certain details and the general construction and operation of a shingle-sawing machine.

This machine is of the general character and belongs to the class of machines described in my application, Serial No. 308,150, filed April 22, 1889, and my other application, Serial No. 319,528, filed August 2, 1889. The specific differences and novel constructions in each application are intended to be summarized in the claims.

Figure 2:
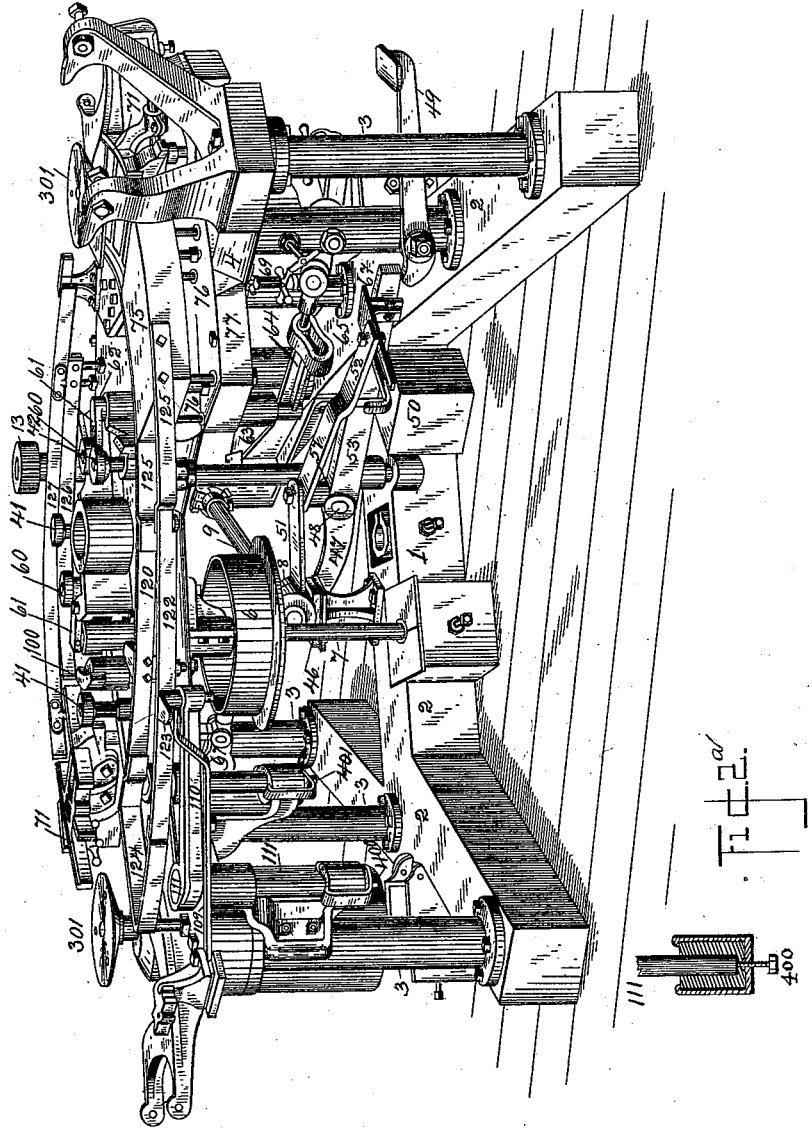
Figure 3:
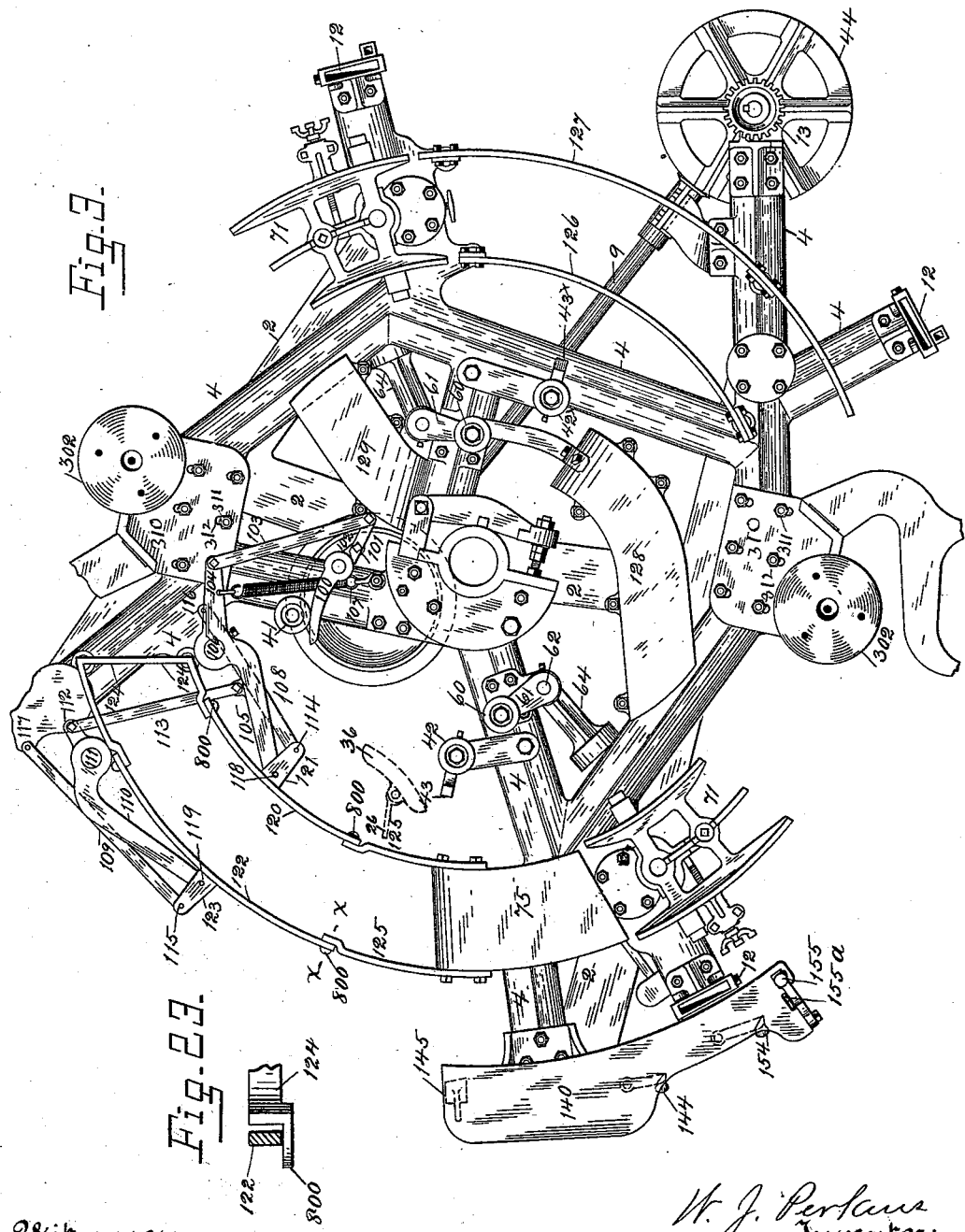
Figure 4:
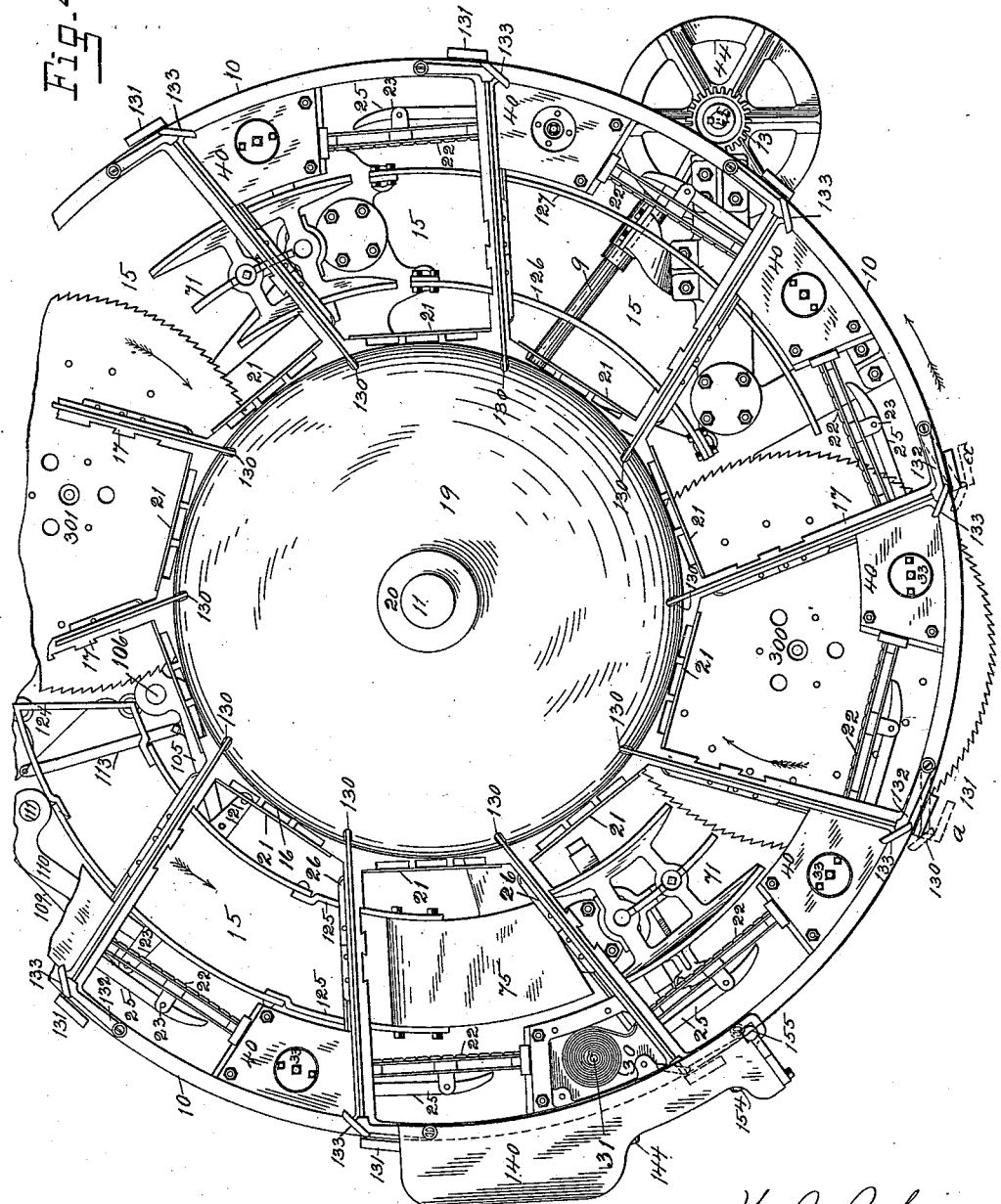
Figure 5:
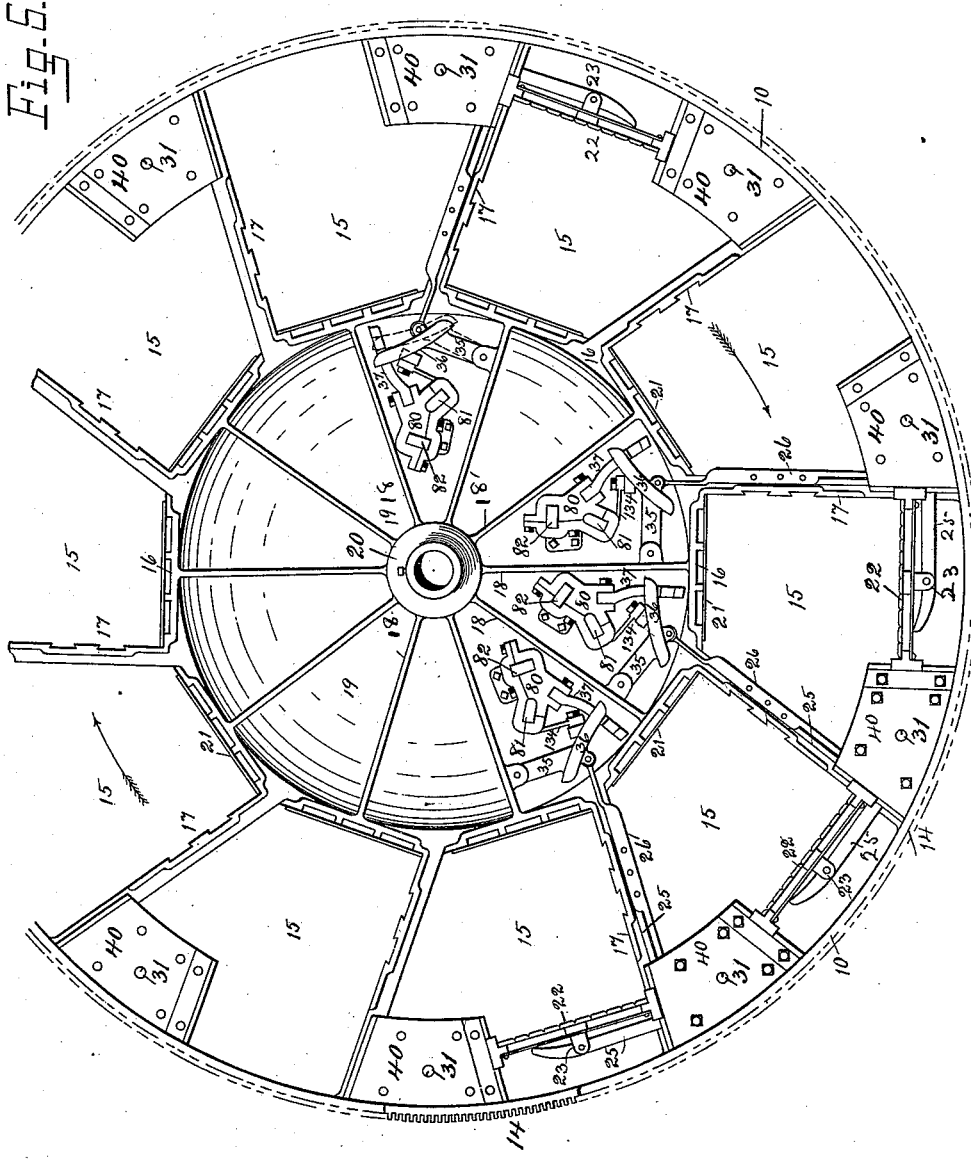
Figure 6:
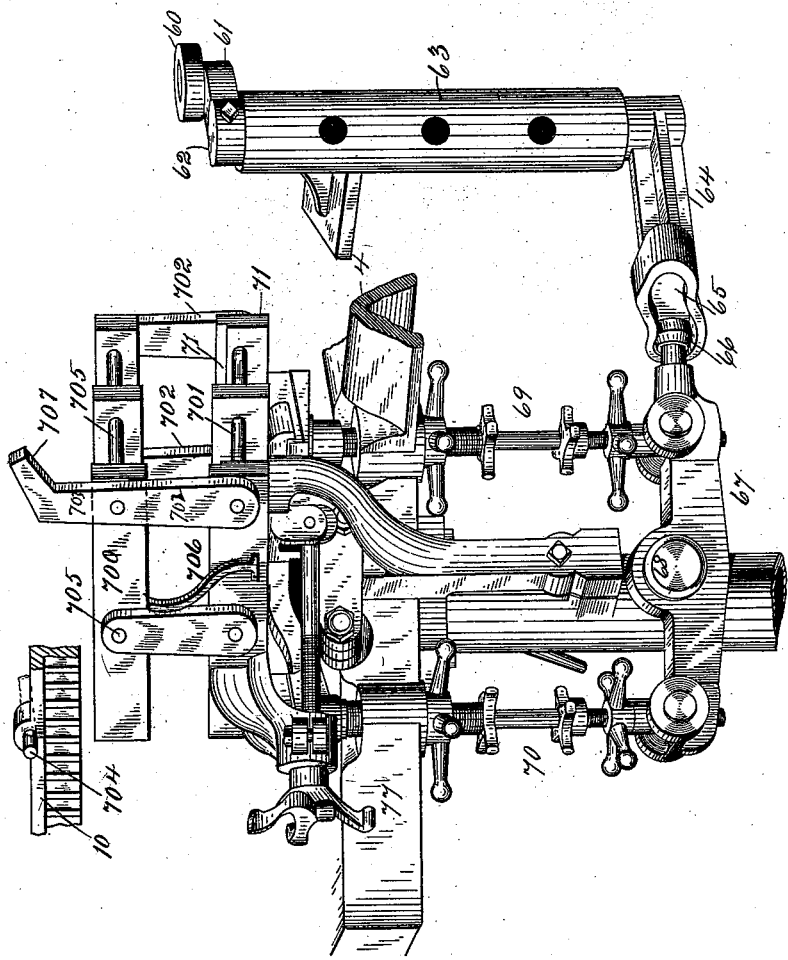
Figure 17:
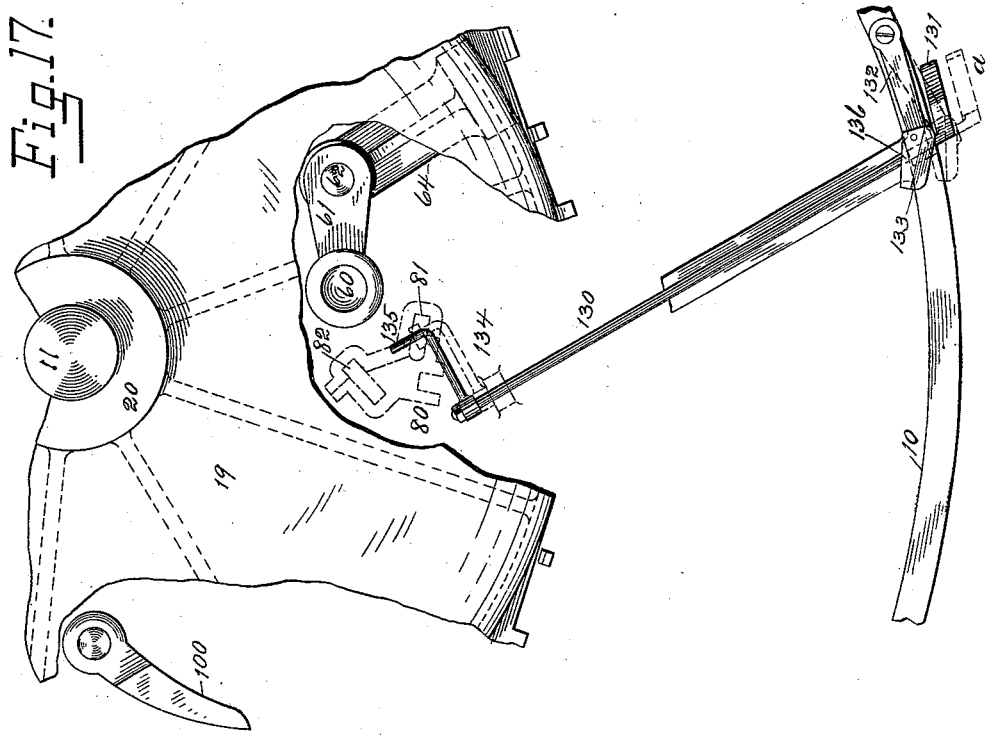

Figure 1 is a perspective view of the machine, some parts being omitted. Fig. 2 is a perspective view of the machine from a different direction, the rotary carriage, saws, and some other parts being omitted. Fig. 2ᵃ is a sectional detail showing adjustable support for spaltway. Fig. 3 is a plan of the frame and some of the working parts hereinafter referred to, the carriage and saws being removed and some parts omitted or broken away. Fig. 4 is a broken top plan of the machine, some parts being omitted. Fig. 5 is an under side or bottom plan of the rotary carriage or carrier, part broken away for convenience of illustration and parts omitted. Fig. 6 is a perspective of the tilt-table and its operating-arm and connections detached. Fig. 7 is a perspective view of the bottom or lower face, and Fig. 8 a side view of the operator's table and its connections detached from the machine. Fig. 9 is a perspective detail of the train for controlling the speed and for stopping and starting the machine. Figs. 10 and 11 are details of the dogging connections. Figs. 12, 13, and 14 are broken details of the dog-rod holder and pusher. Fig. 15 is a perspective of the spring-pocket cover; and Fig. 16, a perspective of dog-spring and connections. Fig. 17 is an enlarged broken plan or diagram showing details of the trips and connections and the arms on which the trips operate. Fig. 18 is a detail of the fly and connections by which the spalter and tilt-table are operated. Fig. 19 is a plan detail of the rock-shaft and engaging abutment and support. Fig. 20 is a perspective of abutment 160 and arm on rock-shaft. Fig. 21 is a broken plan of lever for changing speed. Fig. 22 is a broken side elevation of friction driving-gears. Fig. 23 is a cross-section on line $x\, x$ of Fig. 3 of the junction of the spalting and supporting ways.

The frame of the machine has a solid cast-metal base with upright standards 3 3 and top bars or webs 4 4 extending generally in horizontal direction parallel with the bars of the base. The bars or webs 4 4 are principally made V-shaped with the angle uppermost, so that the sawdust will not lodge on said webs. The bars forming the top web may be integral or may be joined together in any suitable or usual manner. The base formed of metal bars 1 and 2ᵃ is nearly cruciform, there being no outer bars at the periphery of the machine to obstruct access to the central portion. The bars 2 2 extend across what may be termed the "ends" of the machine, (although the machine in plan is nearly round,) and these bars are connected by the tie 1. As seen in Fig. 2, the central portion of the machine is quite accessible from the sides.

The carriage or block-carrier 10 is supported on a shaft 11 at its center, and is also, by preference, supported by suitable supports, as 12 12, Fig. 3, near the periphery, as is common in machines of this class. The rotary carriage or block-carrier 10 is by preference driven by pinion 13, engaging teeth 14 at the periphery of the carriage-rim. The pitch-line of teeth 14 is shown in Fig. 5. The teeth are covered by the overhanging rim in Fig. 4.

The carriage is driven from the pulley 6 on shaft 7. The pulley 6 receives its motion by a belt or gear from a saw-arbor or from any other suitable source of power. A friction-pulley 8, carried on shaft 9, is capable of moving lengthwise on said shaft, but compels the shaft to rotate with it, the pulley being connected to the shaft by a polygonal engagement or by a key, spline, or other engagement common in holding a clutch to its shaft.

The shaft 9 serves to drive the gear-wheel 44 by common form of intermeshing gear, and wheel 44 is firmly held to shaft 45, which shaft carries the pinion 13, so that movement to wheel 44 is communicated to pinion 13 and to the carriage or block-carrier 10.

The shaft 9 is hung in a bearing on the frame, which permits a slight vertical rocking. The inner end of shaft 9 carries a friction-wheel 8, which may be thrown into engagement with the disk-like surface on shaft 7, preferably forming part of pulley 6, or may be dropped down to rest on a friction shoe or brake 46. The end of shaft 9 is carried in a bearing supported on lever 47, which lever is pivoted to the frame or support 48. The inner end of lever 47 will be lifted and the friction-wheel 8 held in contact with the pulley 6 by the action of weight 50, save when said weight is raised by the action of the foot or hand lever 49. The friction-driver 8 will thus be held normally in driving position, but when thrown out of engagement with the driving-pulley will engage a brake and be stopped.

The lever 47 bears a boss 57, which forms a support for a lever 51 52. The lever 51 52 would operate in the same manner if it were in one piece, but is made in parts for convenience, the two parts being joined by a bolt 59, which bolt can turn in its supports.

The lever 47 supports a slotted gage-plate 53, having an index on its face, designating the speed of the carriage-wheel. Lever 52 may be swung on this gage-plate and fastened by set-nut 54. The movement of lever 52 swings lever 51 in opposite direction. The end 55 of lever 51 bears a fork, which engages a groove in the hub of friction-pulley 8. When lever 51 is swung, it moves pulley 8 lengthwise of shaft 9 and nearer to or farther from the center of driving-pulley 6, thus giving greater or less speed to the pulley 8 and shaft 9 when the friction-driver is in contact. The lever 52 may be adjusted and fastened so as to give the desired speed to the shaft 9 and so to the carriage through wheel 44 and pinion 13.

The rotary carriage 10, as illustrated, is made to carry ten blocks to the saws; but any other suitable number of bolt or block compartments 15 may be made in the carriage. The compartments 15 are between the outer rim and the inner rim 16 of the carriage, the bars 17, which divide these compartments, preferably being oblique to lines drawn radial to the carriage-rim. (See Fig. 4.) The space between the hub 20 and the inner rim 16 of the carriage is divided by radial ribs 18, which form a spider, dividing the interior portion of the carriage-wheel preferably into as many compartments as there are block-spaces 15. All these interior compartments are protected by the rigid dome or cover 19, which extends from the hub 20 to the inner rim 16. The dome is permanently secured to the carriage-wheel and supports some of the operative mechanism. The inner compartments of the carriage being protected by the dome or cover 19 and open below will not serve as receptacles for sawdust. The mechanism contained in these interior compartments hereinafter described is attached either to the dome or cover 19 or to the ribs 18, or to both.

The shingle bolts or blocks are held in the compartments or carriers 15 by fixed dogs 21 on or connected to the inner rim and movable dogs 22 near the outer rim of the carriage, one side of each block resting against a bar 17, which bar serves as a pusher to press the block toward the saws in manner well known. The bars 17 may be provided with push-blocks, as is common.

The inner dogs 21 of each compartment or block-carrier are preferably at a right angle to the bar 17, which serves as a pusher to that compartment. The outer movable dogs 22 are generally parallel with the inner or fixed dogs 21; but as the shingle-bolts are not always sawed square it is desirable to give a little play to the dogs 22, so that the bolts may be firmly held by the dogs, whether square-ended or not, and at the same time to limit said play, so as to prevent the binding of the dog on their sliding surfaces.

The dogs 22 have outwardly-extending lugs 23 near their centers. Arms 25 of the dog-rods extend, preferably, from the driving side of the block-compartments past the middle of the dogs. Arms 25 have their ends slightly turned in toward the backs of the dogs 22.

The dogs 22 have their ends extended to form bearings on guideways on the bars 17 and the corner-pieces 40 of the carriage-compartments, and are loosely guided on said ways. The lugs 23 are pivoted to arms 25, so that the dogs 22 may rock slightly on said arms, the inturned ends of said arms serving to limit the rocking in one direction, and the arm 25 near its angle bearing on and limiting the rocking of the dog near the pushing side of the compartment.

The arms 25 of the dogging-rods bend and pass under the bar 17 of the carriage and extend inward toward the central rim of the carriage. The bars 17 of the carriage are substantially of an angle form, and with a flat top web and a downwardly-extending leg in rear of the shingle-bolt. The inwardly-extending arm 25 preferably lies in the angle of the bar, and is bolted to the dogging-rod 26. Rod 26 extends outward from under dome 19, close to bar 17, and is held to arm 25 by screws or bolts. The outer end of rod 26 is pressed inward by spring 30, which spring is coiled in a box or receptacle in the corner-piece 40. The rod 26 is therefore pressed inwardly with a spring-pressure, and arm 25 may be adjusted on said rod by means of the screws or bolts, thus moving the dog 22 nearer to or farther from the fixed dog 21 without changing the position of rod 26 or the tension of spring 30. The spring 30, pressing on the dog-rod, tends to drive dog 22 into the end of the shingle-bolt, thus clamping the bolt firmly between the movable dog 22 and the fixed dog 21.

The dogs 22 are adjustable toward or away from the outer rim on the frame, according to the length of the shingle-bolts. As it is advisable that the center of the saws 300 301 shall be nearly in line with the mid-length of the shingle-bolts means are provided for adjusting the saw-arbors 302 nearer to or farther from the center of the machine, as will be hereinafter explained.

The spring 30 is contained in a pocket in the corner-piece 40. Pieces 40 are located in the corner of the compartments 15, the spring in each pocket in one compartment acting on the dogging-rod for the dog of the compartment next in front.

Spring 30 is coiled helically about a central pin 31, to which said spring is attached. Pin 31 has a polygonal or splined shank, which extends into a hole of similar form in the disk 32. Disk 32 rests in a circular seat 33 in cover 34, which cover forms the top of pocket 40.

The disk 33 can be rotated or partially rotated in its seat and secured in any adjusted position, preferably by screws or bolts extending into holes in the pocket-cover. The holes in the disk and pocket-cover are not all in alinement, but offset, so that the disk need be turned but a little way until some holes will aline. As the disk carries the pin 31 with it, and this pin is secured to the inner end of spring 30, the rotation of plate-disk 32 will regulate the tension of spring 30 precisely as the winding of a watch puts tension on the mainspring. This helical or watch spring applied to the holding-dog of a shingle-machine is very efficient in operation, as a very long spring may be used without encroaching on available space.

The inner end of dog-rod 26 is pivoted to a link 35, which link is preferably pivoted to one of the webs 18 and has an inclined surface 36, with its working face toward the center of the carriage.

A roller 41, Fig. 3, supported on the frame beneath the carriage, is in the path of movement of the bearing-inclines 36 as the carriage rotates. The engagement of an incline 36 with said roll throws the incline 36 outward, swinging link 35 on its pivot and pressing out the dog-rod 36 and dog 22 against the pressure of spring 30. When the dog is pressed outward, a hook or catch 37, supported on a suitable pivot and having a shoulder 38, falls behind or inside of the inclined bearing 36 and holds said bearing (and consequently the dog 22) pressed out, so that the dog cannot engage a block until the hook is released. (See detail views, Figs. 12, 13, and 14.) This release of the dog may happen directly after the shingle-bolt has passed over the saw, or at any convenient time, when the bolt is released and dropped onto the spalting-ways. The hook 37 serves to hold the movable dog outward without frictional resistance until the carriage has passed around to such position that the incline 39 on the hook 37 engages an abutment 43 on the frame, which lifts said hook so that its shoulder no longer holds the incline 36. At the instant the hook 37 is about to be released from its engagement with the movable dog said dog is in position to be engaged and pressed outward for an instant by the roller or bearing 42 on the frame. This engagement of roller 42 with the dog relieves the strain or friction in releasing the hook. The bearing 42 is not a necessity, but increases the effectiveness of the machine. As soon as the incline 36 passes roll 42 (the hook being raised and said incline no longer pressed out) the dog-spring will force the dog inward into the shingle-bolt.

Mechanism for holding the dogs in open position is shown and broadly claimed in my application, Serial No. 319,528, filed August 2, 1889.

In the present device I have shown but one side of the machine provided with a spalt-dropper. Consequently I have provided mechanism for holding the dogs open on the spalting side of the machine only, while the carriage-compartments pass from roll 41 to roll 42, Fig. 3. At the other side of the machine it is only needful to undog the bolts for an instant, so that they may drop onto the tilt-table. Consequently the roll 41 may be omitted at that side and the dog loosened for an instant by roll $42^\times$, the incline $43^\times$ preventing the hook from holding it open. The action of the undogging mechanism is automatic, and each bolt is undogged and tilted, if desirable, before it moves onto the saw, however many bolt-receptacles and saws there may be.

Where two saws and two tilt-tables are used on a machine of the kind illustrated, the tilt-tables normally stand inclined in opposite directions—that is, one tilt-table is inclined so that all the blocks dropped on it will fall so that shingle-butts will be cut from the ends of the bolts toward the center of the machine and the other inclined in reverse direction, so that the shingle-points will be toward the center of the machine; but as it is desirable to have the shingles as nearly straight with the grain of the wood as possible it frequently becomes desirable to cut two or more shingle-butts successively from one end of the shingle-bolt. To do this, it is necessary to shift a tilt-table, and as it is not usual for two succeeding blocks to require this abnormal "graining" or tilting it is desirable that the tilt-table be immediately returned to normal position, although, if desirable, any number of succeeding blocks may be tilted for graining.

In my Patent No. 380,346, of April 3, 1888, I show and describe a tilt-table and apparatus for shifting and restoring the same. In the present machine I have introduced new and improved mechanism, relieved the operator of much exertion, and diminished amount of skill required; have also placed the tilt-operating mechanism near the center of the machine, where it is out of the way; also raised same up out of the accumulating sawdust or debris.

Opposite each compartment in the carriage between the webs 18 and under the dome or cover 19 I place what I have termed a "fly" 80, the construction of which will be explained hereinafter. At present it will suffice to say that the fly has two trips, slides, or abutments, one of which, 81, is necessarily projected whenever the other, 82, is retracted. When projected, one or the other of these trips extend in position to engage actuating parts of the tilting device, as rolls 60, suitably supported. The same trip, slide, or abutment in the example of my invention illustrated in the drawings is adapted to actuate the spalting mechanism, the primary object of the second trip, slide, or abutment being to return tilts to normal position. The rolls or bearing-pieces 60 (rolls being merely used to avoid friction) are preferably supported on levers 61, Figs. 3 and 6, said levers being connected to rock-shafts 62, which have suitable bearings. When a trip 81 is in operative position, it will, as the carriage moves forward, engage one side of roll 60 and swing lever 61 and rock-shaft 62 in one direction, while the opposite trip 82 on the carriage following, if in operative position, will engage the other side of said roll and rock the shaft in reverse direction, returning tilt to normal position, provided the parts are arranged to engage substantially as will be explained; but if the following opposite trip is out of operative position it will pass by said roll, leaving the tilt reversed for succeeding carriage.

Referring now to Fig. 6, 63 represents the bearing or housing in which rock-shaft 62 is inclosed. The lower end of shaft 62 bears an arm or lever 64. Both lever 61 and arm 64 are preferably secured to the rock-shaft, so that the swinging of lever 61 swings arm 64. The end of arm 64 farthest from the rock-shaft may have a suitable cam 65, and the roll 66 at the end of walking-beam 67 engages with said cam 65. The rocking of shaft 62 swings arm 64, and cam 65 serves to raise or lower the roller 66 and rock the walking-beam 67 on its pivot 68 whenever the shaft 62 is rocked. The walking-beam 67 alternately raises the opposite sides of the tilt-table 71 by means of risers 69 and 70 whenever the walking-beam is shifted. The side of the tilt-table 71 as the riser 69 or 70 is withdrawn descends by gravity until it rests on suitable supports.

The general construction of the tilt-table illustrated is fully shown, and is claimed in my patent above referred to, and a further description here is deemed unnecessary. It will be noted, however, that the rock-shaft 62 and its arms and connections are adapted to shift other tilt-tables. Tilt-tables of various constructions are well known in the art.

It sometimes happens that a shingle-bolt has a checked or rotten place or large knot or other defect therein which occupies a thickness sufficient to make several shingles. If this part has to be sawed into shingles, considerable time is wasted. To save this and enable a cut of two or three inches at once to be taken from the shingle-bolt, I have devised a tilt-table having an adjustment to and from the plane of the saw. Said adjustment is preferably made by the machine, but may be actuated direct by the operator. In the example of this part of my invention as illustrated in the drawings 700 shows the tilt-table top or rest which supports the shingle-bolt, and this top is preferably supported upon the pivotal supports or legs 702, &c., two on each side, pivoted at 701 705. A spring 706 holds the table in its upper or normal position, or in the position for the saw to operate on the bolt in cutting shingles. 703 is an actuating-arm connected to the tilt-table and having an incline surface 707, adapted to be operated upon by a suitable trip. 704 is an adjustable trip connected to the machine so as to move with the carriage-rim. This trip is under the control of the operator, so that whenever the operator sees that the shingle-bolt contains a defect of any kind of greater thickness than a shingle he can cause the trip to project, by moving it out by hand or in any other convenient way, so that it will come in contact with the operating-surface of the cam 703 and thereby depress the tilt-table as it passes by the saw, thereby allowing the shingle-bolt to fall, when the dogs will clamp it and carry it to the saw, so as to cut from the bolt the defective part. The trip 704 is shown, Fig. 6, as a pin which is supported in a bearing on the carriage-wheel and may be moved lengthwise in said bearing by the hand of the operator. After the bolt has been carried beyond the tilt-table the spring will again bring the table-top to its normal position.

It is sometimes desirable to adjust the end of the way or support on which the shingle-bolts slide when undogged, so as to approximate the position of the tilt-table. For this purpose I have placed platform or table 75 in position at the end of the spalting-way, just in front of the tilt-table. This table or platform 75 is supported by set-screws 76, which enter a rest 77 on the frame. By turning some of the screws 76 out and others in any needful adjustment of platform 75 may be had. (See Fig. 2.) When set to do so, one of the trips 81 of the fly 80 (carried by the carriage-wheel) engages lever or arm 100. This lever 100 is preferably hung on the frame. An arm 101 has synchronous movement with arm 100, Fig. 3. Arm 101 is integral with or connected to arm 100. The lever or arm 101 is connected by a link 103 with an arm 104 of lever or arm 105, which lever or arm 105 is preferably pivoted or fulcrumed to the frame at 106. A spring 107 connects one arm of lever 105 to the frame. One of the movable ways or tracks 120 has an extending bar or lug 121, which is pivoted to the lever or arm 105. The other way, 122, has an extension 123, which is pivoted on a lever or arm 110, which lever is supported on vertical shaft 111 as a fulcrum.

The lever 110 is pivoted to the frame at 111 and has an arm 112, which is connected by a pivotal link 113 with arm or lever 105 at the opposite side of the pivot from its connection with lever 110. Now as the levers or arms 105 and 110, respectively, support the movable ways or spalt-carriers 120 and 122 and lever or arm 105 is connected to lever 100 by the train of mechanism 101 103 104, hereinbefore described, it follows that when lever or arm 100 is swung on its pivot or fulcrum the two levers or arms 105 and 110 will be swung in opposite directions, and one will carry its track-section outward and the other inward with reference to the center of the machine; but as ways 120 and 122 are pivotally supported on their levers they might swing into a position to cramp or drop the spalts in wrong position. To insure a parallel movement, or nearly so, of the ways 120 122, a link 108 is pivoted to the inner end of extension 121 and to the frame, and a corresponding link 109 is pivoted to the outer extension 123 and to the frame. The pivotal points 114 and 115, where these links are connected to the extensions of the movable ways, must move in circles about the pivots 116 and 117, where the links 114 and 115 are attached to the frame. As the pivots 118 and 119 will swing about the centers 106 and 111 the ways 120 and 122 will be compelled to maintain a position nearly parallel to each other, whether in closed position or swung apart. If swung apart, the ways will drop the spalt between them, and when free to do so the spring 107 will cause the ways to move toward each other, as in Fig. 3, and make a continuation or movable section of the track-sections 124 and 125, which form the block-support at the ends of the spalt-dropper. It is desirable that spalt-carriers 120 and 122 have a vertical adjustment. Adjusting-screws 400 and 401 directly support pivots 111 and 106, thereby providing for said adjustment.

As has been stated, the block-supporting ways 126 and 127 at one side of the machine may be fixed and all the spalts dropped at the side of the machine having the movable spalt-dropper.

The movable ways may receive support when closed by suitable projections or bearing-pieces 800 on the fixed ways 124 and 125.

The sawdust-spouts 128 and 129 are separate from each other, and both have downturned mouths near the center of the machine.

The fly 80, having the trips 81 and 82, is set so that one or the other of said trips is thrown into operative position by means of a rock-shaft 130, preferably extending from the fly out to the rim of the wheel of the carriage between each of the block compartments. Each of these rods 130 has or may have a plurality of movements—for instance, a longitudinal movement and a rocking movement—and will operate to set the trips by its rocking, whether it be drawn out or pressed in. The outer end of each shaft-rod 130 has an arm 131 outside the rim of the carriage-wheel. This arm 131 is in the form of a shuttle, as shown, having inclines on its upper and lower sides. The shaft 130 has its outer bearings in a carrier 132, pivoted to the rim of the carriage and provided with an incline or face-piece 133. When the piece 133 encounters an abutment, hereinafter described, it will be rocked outward, as shown in dotted lines, Fig. 4, at a a, and Fig. 17, sliding the rod or shaft 130 and shuttle 131 outward a little beyond the rim of wheel 10. (See Fig. 18.)

The trips 81, when thrown down and brought around by the carriage, will engage the outer sides of rollers or abutments 60 and press these rollers inward, thus rocking the arms 64 and working the tilt-tables in one direction, while the trips 82, when depressed, engage the inner sides of these abutments 60 and produce a reversal of the tilts. As has been explained, when one trip 81 is down the other 82 is up out of operative position.

The inner end of each rock-shaft 130 carries a crank 134, which engages the trip 81, and when the shaft is rocked this trip is thrown up or down, according to the direction of the shaft movement. The crank-arm 134 has an elongated pin 135, which engages trip 81 whether the rod 130 be drawn out or in.

Now suppose both arms 64 are set so as to maintain their respective tilt-tables in normal position when the trips 81 are lifted up. The trips 82, which extend below the web of the carriage, will then ride past the inner sides of rolls 60, engaging said rolls to throw them out if they are pressed inward out of normal position, but otherwise sliding past without engagement; but if the leading end of inclined arm 131 be rocked down, thus rocking the shaft 130, trip 81 will be thrown down, and as the carriage moves forward this trip 81 will engage roll 60 and operate the tilt-table into abnormal position. In like manner the trip 81 will operate the spalt-dropper by engagement with arm 100 if the tilt 81 be thrown down at the proper time to engage said trip; but if only one trip 81 be thrown down the trip 82 in the succeeding carriage, being normally down, will engage the inner side of roll 60 and restore the tilt-table to its normal position, so that the changing of a tilt-table by setting a trip 81 acts only on one block, the next trip 82 reversing the tilt-table again. As the spalt-dropper automatically closes as soon as trip 81 passes away from arm 100 no mechanism, except spring 107, is needed to restore the spaltways to normal position.

The mechanism for working rock-shafts 130, and thereby the trips 81 82, is primarily under control of the operator, and the controlling-catches are shown as connected to the operator's table 140.

Referring to Figs. 7 and 8, 141 represents a pivoted catch or bar. On this bar is an incline or shoulder 142, which shoulder will engage the incline 131 and rock the shaft 130, if the bar 141 be pressed in, into the dotted position, Fig. 7. After the arm 131 has been rocked the incline 143 on the end of catch 141 is engaged by the end of rod 130 and the trip 142 is forced back so it will not operate on the next succeeding arm 130. Thus the operator, by pressing handle 144 inward when he sees a block approaching which needs an abnormal cut, can set the tilt-table to give such a cut to that block, and all parts of the machine will be automatically restored to normal position as soon as that cut is made. The arm 131 of rock-shaft 130 is restored to normal inoperative position as soon as it has pressed incline 142 far enough to operate the first tilt-table by means of contact with stop 900, projecting in this case from the sawyer's table and of such form as to be engaged by the arm 131 of the rock-shaft when said arm is in abnormal position.

If it be desired to operate the tilt-table at the opposite side of the machine, the operator presses in handle 154, swinging the bar 151 and carrying the incline 152 into position to operate the arm 131 precisely as did incline 142 for the first table. The engagement of the end of shaft 130 with the incline 153 on the bar 151 restores said bar to inoperative position in the same manner that bar 141 is restored. If the inclined arm 131 is turned down by the second incline 152, it will remain turned down until it rides around past the second tilt-table, when it will be replaced in normal adjustment by engagement with a suitable stop outside of the carriage-wheel, as the stop 145, Figs. 3, 7, and 8; but if it is desired to operate the spalt-dropper the handle 155 near the end of the operator's table is pressed down. This carries an abutment 156 down into the path of movement of the in-incline 133 on the bearing-pieces 132 on the carriage. The abutment 156 draws the rock-shaft 130 outward by swinging piece 132, the bearing being somewhat loose on the rock-shaft. An arm 131 on the end of the rock-shaft is neither turned up nor down by the abutment 156. If it has been turned down by incline 152, it will stay down; if otherwise, it will remain up, and trip 81 will be in corresponding position.

155ª is a secondary spalting-handle. 153ª is a spring bearing against the abutment 156, which has an inclined lower surface. The function of this spring is to hold the handle 155 either up or down. By shifting the handle 155ª the spring 153ª is moved away from the handle 155 by the handle 155ª acting as a wedge. When spring 153ª is pressed back from incline 156, it allows the handle 155 to drop by gravity, in which position it engages with arm 131 and ejects the spalts or blocks from the machine as fast as the same are brought to the spalting device. It will be noticed that the same kind of a retaining spring and catch may be readily applied to the tilt-table handles or trips.

The saw-guard 159 over saw 301 has a post 160, Figs. 19 and 20, which carries two abutments. The abutment 161 at the upper part of the post will engage arm 131 when that arm is in its outermost position and turn it down, if it be not already down, thus dropping trip 81 into position to open the spalt-dropper; but if arm 131 be in its innermost position near the rim of the wheel abutment 161 will not engage said arm at all, so that the spalt-dropper will only be operated when the operator has caused arm 131 and its rock-shaft to be drawn out by depressing handle 155.

If the arm 131 is in its inner position as it approaches post 160 and is turned down, as it would be after operating the second tilt, the effect would be to operate the spalter; but to prevent this, abutment 162 turns up the arm 131, and thus lifts trip 81. In its outer position arm 131 rides by without engaging abutment 162. (See detail, Figs. 19 and 20.)

If the arm 131 is either in its outer or turned-down position as it approaches the operator's table 140, it will be restored to its normal inner and raised position by engaging the double incline 145 at the first end of the table. This incline has the effect of restoring any and every operating-arm 131 and shaft 130 to normal inoperative position whenever such parts shall reach the table 140 in abnormal position. The handle 155 is restored to its raised or inoperative position after engagement with the incline 133 to draw out a rock-shaft 130 by an incline 136 on the bearing-piece 132, Fig. 17. The arms 131 will be held by gravity or by friction or a friction-spring in either their upturned or downturned position, and the rock-shafts will be similarly held either in or out. In fact, the parts are so balanced that when placed in any adjusted position there is little tendency to leave it.

In Fig. 18 I show a section of the fly 80, which carries the trips 81 and 82. These trips or abutments are mere spiders, preferably connected together by a mutilated pinion 83, which is journaled at 84 and has teeth 85, engaging teeth 86 and 87 on the trips. The crank-pin 135 passes through a hole 88 in the trip 81 and is long enough to slide back and forth in said hole without being drawn out. It is quite apparent that the mutilated pinion 83, connecting the trips 81 and 82, is simply one form of a lever, arm, or rock-shaft.

In order that the center of the saw may be opposite the center of the blocks or bolts, whether long or short bolts be sawed, the saw-arbors 302 are made radially adjustable with reference to the center of the machine. The machine will not generally be required to saw bolts varying more than two inches in length. Consequently the change of one inch in the saw-arbor will compensate for a change in length of two inches in the blocks; but greater variation in changes may readily be made in same manner. Said incline engages the inclined surface of abutment 156 and lifts the abutment and handle. The saw-arbors 302 are sustained at their lower ends in bridge-pots 303, and each bridge-pot is supported on plate 500, which extends from the frame. The bearing of the arbor in the bridge-pot may be shifted by screws 304, passing through the sides of the bridge-pot. (See Fig. 1.) The upper bearings of arbors 302 are supported by the plates 310, which are adjustable on the frame by means of bolts 311, passing through slots 312 in said plates. (See Fig. 3.)

Referring to my patent hereinbefore cited and to other machines of this class, it will be seen that the present machine embodies many radical changes and improvements. The constructions by which many working parts are carried to the central portion of the carriage under the dome or cover, by which dirt and sawdust are excluded, were matters of considerable difficulty.

In the operation of the machine the dogging and undogging are purely automatic and the dogs are held open by devices which cause no loss of power by friction on the working parts of the machine. The tilt of either table and the spalt-dropper are under control of the operator and are partially affected by the same operative train of mechanism—that is, many of the devices have multiple functions, and the number of working parts is in this manner reduced. Thus if the operator desires to change the grain of a single block by a single cut at the tilt nearest him he will press in handle 144 and give the matter no more attention. The machine will make the one abnormal cut and then all parts resume normal relations and the work goes on. If it is desired to take two cuts, both handles 144 and 154 are pushed in, and after the two odd cuts on that block the machine cuts normally, and all the time it cuts normally on all the other blocks in the carriers. If the operator desires to take an abnormal cut only on the saw farthest from him and then drop the spalt, he does so by pressing in handles 154 and 155, and to drop the spalt alone he presses in handle 155 alone and the machine does the rest in the manner explained, while all the other carriers are left to operate in their usual manner.

It will readily be understood by a person skilled in this art that many parts of the machine may be altered in various ways without departing from the spirit of this invention. I desire to be understood as intending to cover in my claims equivalent mechanism so far as the same is fairly within the scope of my invention.

What I claim is—

1. The combination of the rotary carriage, driving counter-shafts, and engaging gears, the friction-disk on the counter-shaft and the friction-driver engaging therewith, the weighted lever holding said driver in engagement, and the shifting-lever pivoted to and supported by said weighted lever all substantially as described.

2. In a shingle-machine, the combination of the main driving-disk, a friction-wheel on a shaft, said wheel shiftable on said shaft into various engaging positions with relation to said driving-disk, a lever in proximity to said shifting-wheel by which it is pressed toward or away from the driving-disk, a second lever mounted on the first and having engagement with the friction-wheel to shift it lengthwise on its shaft and across the face of the driving-disk and a gage mounted on the first lever serving to indicate the position of the second lever.

3. The combination in a shingle-machine, of the main driving-disk, a driving-shaft and friction-wheel thereon in position to engage said driving-disk, a lever by which said friction-wheel may be shifted toward and away from the main driving-disk, a lever mounted on said first-mentioned lever and engaging the friction-wheel to shift it across the face of the driving-disk, and a gage-plate and fastening device by which the position of the friction-wheel is determined, and by which it is held, all substantially as described.

4. A rotary shingle-machine carriage arranged horizontally and having an outer and an inner rim, a central hub, mechanism between the inner rim and the hub by which the spalter, tilt, or other adjunctive parts of the machine are thrown into operation, and a rigid covering over and supporting parts of said mechanism to exclude sawdust from the top, but leaving the space under the cover open at the bottom, in combination as set forth.

5. In a shingle-machine, the combination with the bolt-carrier, and a draw-rod extending lengthwise of the carrier, a movable dog connected to said rod and located at one end of said carrier, an actuating-rod pivotally connected to said dog so that the dog may adjust itself within a given limit to the block, a stop to limit said adjusting movement, and a spring tending to press said dog into the block or bolt, substantially as described.

6. In a shingle-sawing machine, a carriage, a movable dog therein having an extending lug and a dog-rod having a bent arm extending past the extending lug of the dog and pivoted thereto, the end of said rod being formed to serve as a stop to limit the swinging movement of the dog, in combination substantially as described.

7. In a shingle-sawing machine, the combination with the carrier of a movable dog and means for shifting the same, a dog-rod section connected to said dog, and a second rod-section adjustably connected to the first, and a spring bearing on one of the rod-sections, whereby the dog-rod may be extended or shortened in length without changing the relation of the spring thereto, substantially as described.

8. The combination with the bolt-carriage of a movable dog, a dogging-rod, and a helically-coiled spring in a pocket in the carriage and bearing on a piece connected to the dog, substantially as described.

9. The combination with a rotary carriage, having a bolt-compartment, of a movable dog in said compartment, a pocket at the corner of the compartment containing a coiled spring, and a cover to said compartment whereby the spring is protected from the debris, substantially as described.

10. The rotary carriage having block-compartments, the pockets in said compartments, the dog-rods, the springs in the pockets bearing on said rods, the pocket-covers having recesses therein, and the plate adjustably secured in said recesses and connected to the springs, all in combination substantially as described.

11. The combination with the carriage and movable dog and its rod and spring, of a link completing engagement with the inner end of the dog-rod and parts attached to central shaft, an abutment relatively fixed in position to engage said link, and a catch on parts attached to central shaft in position to engage and hold said rod and spring under pressure when past the engaging abutment, substantially as described.

12. The combination with the carriage, dog, and dogging-rod and spring substantially as described, and a link forming connection between the end of the rod and the carriage, of the catch on the carriage engaging said link on the dogging-rod to hold the spring compressed, and a releasing-abutment disconnected from the carriage and disengaging said catch at proper times, substantially as described.

13. The combination of the rotary carriage, dog-rod, and spring, of the pivoted link and dog-rod, an incline on said link, a bearing-piece on the frame in position to engage said incline, and compress the spring, a catch to hold the spring compressed, and an abutting surface on the frame in position to disengage said catch.

14. The combination with the dog-rod, spring, and catch engaging the rod to hold the spring compressed, of a trip in position to release said catch, and an abutting and retaining surface in position to hold the dog for an instant when the catch is disengaged, substantially as described.

15. The combination with the rotary carriage of an adjustable trip inside the rim thereof, a tilt-table, and an actuating-arm and connections to operate said table, said arm projecting into the path of movement of the trip, substantially as described.

16. The combination with the carriage having a forward movement, and provided with an adjustable trip, and with the tilt-table, of a rock-shaft having an arm in the path of movement of the trip on said carriage, and an arm on said rock-shaft having a suitable cam, engaging the actuating-beam of said tilt-table, substantially as described.

17. In a shingle-machine, the combination of a rotary carriage bearing an adjustable trip, a rock-shaft, having an arm in the path of movement of said trip, an arm on the rock-shaft having a suitable cam, and a tilt-table having a walking-beam engaging the cam, all substantially as described.

18. The combination with the body of a tilt-table, of a depressible top whereby the bolt-supporting surface of the table may be lowered or moved away from the plane of the saw temporarily, substantially as described.

19. The combination with the frame and tilt-table, of the bolt-supporting way and a single platform having a plane surface forming the termination of said way next to the tilt-table, and set-screws supporting the platform from the frame, whereby the platform may be adjusted relatively to the frame and table, substantially as described.

20. The combination with the rotary carriage, of a trip borne by the carriage within the periphery of the carriage-wheel, means to actuate the trip, and a spalt-dropping way having an adjunctive train of operating connections extending toward the center of the machine and in position to be engaged by said trip to drop the spalt, substantially as described.

21. The combination with the spalt-dropping way, of a lever supporting said way, a vertical shaft forming the fulcrum for said lever, means for adjusting said shaft vertically and thereby adjusting the lever and way, and means for swinging said lever to open the way, all substantially as described.

22. The combination with the rotary carriage, of a mechanically-operated trip within the periphery thereof, a spalt-dropper, and an actuating-arm connected to said spalt-dropper and in the path of movement of said trip when the latter is in abnormal position, substantially as described.

23. In a spalt-dropper, a pair of track-sections arranged in substantially concentric lines, pivoted arms on which said track-sections are supported, and connections between the track-sections and the frame to preserve parallelism of the track-sections when the track-sections are displaced from normal position, in combination substantially as described.

24. In a spalt-dropper, the combination of parallel track-sections, levers or arms carried on vertical pivots, which levers or arms support said track-sections, and connections between the levers or arms at opposite sides of their pivots, whereby the track-sections are moved in opposite directions, substantially as described.

25. In a spalt-dropper, the combination of the block-supporting track-sections, a system of levers or arms connecting the same whereby the block-supports are moved simultaneously in opposite directions, and a lever system connecting the movable section to the frame whereby the track-sections are held substantially parallel while moving, substantially as described.

26. The combination with the movable spaltways, and their operating mechanism, of a lever or arm connected thereto and extending inwardly toward the center of the machine, a rotary carriage, and an adjustable trip within the rim thereof, adapted when in abnormal position to engage said arm and actuate the spalt-operating mechanism, substantially as described.

27. The combination with the rotary carriage, of a fly supporting a pair of trips, said trips moving synchronously with the carriage, so that one is retracted as the other is extended, and an adjunctive mechanism operated by said trips, substantially as described.

28. The combination with the carriage of a pair of trips moving synchronously therewith, and a lever or equivalent operating on said trips to cause them to move in opposite directions, and an adjunctive mechanism operated by said trips, substantially as described.

29. The combination with the carriage of a plurality of trips, and adjunctive mechanism operated thereby, said trips arranged substantially as described, so that one will be operative, while another is in inoperative position, and a rod or bar operating the trips and extending to the carriage-rim, in position to be actuated near the rim, substantially as described.

30. The combination with the carriage of a pair of trips adapted to operate alternatively, substantially as described, a rod or bar connected to said trips, said rod or bar supported in bearings to permit rotary and longitudinal movement and extending to the rim of the carriage, and adjunctive mechanism actuated by said trips, substantially as described.

31. The combination with the carriage, of the trips, connected substantially as described, a rod or shaft having operative engagement with one trip, said rod supported in bearings so that it can be moved into abnormal position, and remaining in operative relation with one of the trips whether in normal or abnormal position, and adjunctive mechanism operated by the trips, substantially as described.

32. The combination with the carriage of a trip arranged substantially as described, adjunctive mechanism actuated by said trip to throw into or out of operation a subordinate part of the machine, a rod or shaft having operative engagement with said trip, said rod supported in bearings so that it can be moved into abnormal position, and remaining in operative relation with the trip whether in normal or abnormal position.

33. The combination with the rotary carriage of a trip inside the rim thereof in operative relation with a subordinate part of the machine, a shaft or rod having engagement with said trip and supported in bearings which permit the movement into abnormal position, and an abutment, catch or stop, disconnected with the carriage and in position to engage and move the rod into abnormal position, and thus control the trip.

34. The combination with the rotary carriage of a fly inside the rim thereof, having a plurality of trips arranged substantially as described in operative relation with subordinate parts of the machine, a rod or bar controlling the trips, and extending outwardly, and an engaging catch outside the carriage and movable into position to engage and operate the rod or bar, substantially as described.

35. The combination with the rotary carriage, of a fly inside the rim thereof, having a plurality of trips arranged substantially as described in operative relation with subordinate parts of the machine, a rod or bar controlling the trips, and an engaging catch outside the carriage and movable into position to engage and operate the rod or bar, substantially as described.

36. The combination of the rotary carriage, of a trip inside the rim thereof movable into position to actuate the spalter, tilter, or other adjunct, and a rod or bar controlling the same by its movement, and extending outward, and a series of catches disconnected from the carriage, but movable into position to operate the bar and thus control the trip, and mechanism actuated thereby, substantially as described.

37. The combination with the rotary carriage of a series of trips carried within the rim thereof, a rod, or bar for actuating the trips, said bar supported for adjustment into abnormal positions while controlling the trips, and an abutment outside the carriage in position to actuate the rod or bar by engagement therewith, and to be shifted out of said engaging position.

38. The combination with the rotary carriage of a trip within the rim thereof, a rod or bar having a plurality of operative positions and controlling said trip, an abutment or catch disconnected from the carriage in position to impart one movement to said rod when set to do so, and an abutment or catch in position to engage the rod or bar and shift it to a second operative position substantially as set forth.

39. The combination with the rotary carriage, of a trip within the rim thereof, a rock-shaft having endwise movement and controlling said trip, an abutment or catch disconnected from the carriage, in position to rock said shaft when set to do so, and an abutment or catch in position to engage the shaft and shift it in the direction of its length, as set forth.

40. The combination with the rotary carriage of the trip within the rim thereof in operative relation with a subordinate part of the machine, a rod or bar extending from said trip, a catch or abutting surface movable into position to engage said rod or bar and shift it in direction of its length, and an abutment outside the carriage in position to move the shaft when engaged by it, substantially as described 41. The combination with the rotary carriage, of a trip, a rod or bar extending outwardly therefrom, a table outside the carriages, and a movable catch on said table having an abutting-surface which actuates said rod or bar when the catch is moved into engaging position, and an abutting surface moving with the carriage by which surface the catch is restored to normal position automatically after said engagement.

42. In a shingle-machine, a series of forwardly-moving block-carriers, a plurality of saws, a plurality of trips moving synchronously with the carriers and in position to operate on adjunctive parts of the machine, a rod or bar for each carrier extending from near the trips, to position of engagement with an abutment, and an abutment under control of the operator and movable into position to engage the bar and thus actuate the trips, in combination substantially as described.

43. The combination with the carriage and adjunctive mechanism substantially as described, of a series of trip rods or bars extending from the rim to the inside of the bolt-carrier and movable into abnormal position for the purpose described, and an engaging surface (as 145) independent of the carriage in position to restore all the trip rods or bars to normal position after the trips have completed their work, substantially as described.

44. In a shingle-machine, a series of forwardly-moving carriers connected together, a bar moving with each carrier in position to set a trip for actuating either of a plurality of adjunctive devices, and a plurality of abutments under control of the operator, each movable to position to shift the bar to actuate the trip, in combination, substantially as described.

45. In a shingle-sawing machine, the operator's table provided with movable surfaces 142 and 152, and the inclines 143 and 153, and the rotary carriage having a bar and connected mechanism to engage said surfaces under the prescribed conditions and thereby act on adjunctive parts of the machine, the parts in combination substantially as described.

46. In a shingle-machine, the movable parts (as 143 and 153) outside the carriage and under control of the operator an abutment, (as 900) between said parts, and the rotary carriage having a bar and connected mechanism to engage said parts under the prescribed conditions, the parts in combination substantially as described.

47. In a shingle-machine the combination of two movable track-sections and stationary tracks, said stationary tracks provided with supporting-lugs adapted to support the track-sections when in normal position, substantially as described.

48. The combination in a shingle-machine of a saw, a continuously-moving carriage, a tilt-table having a bolt-bearing surface adjustable to and from the plane of the saw, a trip adapted to operate said adjustable bolt-supporting surface, and an abutment operated on by said trip to change the plane of the table-top, substantially as described.

49. In a shingle-machine, the combination of a rotary carrier, a tilt-table having movement to and from the plane of the saw, a trip on the carrier for raising or lowering said tilt-table, and an abutment outside the carrier, for moving said trip into normal position.

50. In a shingle-machine the combination with a rotary carrier, a tilt-table having a bolt-supporting surface adapted to have adjustment to and from the plane of the saw, pivoted arms connecting the base to said movable surface, and a spring adapted to sustain said bolt-supporting surface in its normal position, and suitable mechanism for automatically moving said bolt-supporting surface away from the plane of the saw against the action of the spring.

51. The combination with the body of the tilt-table of an automatically-depressible top, whereby the bolt-supporting surface of the table may be lowered or moved from the saw temporarily, substantially as described.

52. The combination, in a shingle-machine, with a saw, a continuously-moving carriage, and a tilt-table, having a bolt-bearing surface automatically adjustable to and from the plane of the saw, of a trip, and suitable mechanism for operating said trip.

53. The combination with a series of bolt-holding carriers arranged in a circle forming a circular carriage, of a trip inside the rim of said carriage, a spalt-dropping device substantially as described, and a rod or bar situated adjacent to the partition between said carriers and completing operative engagement between said trip and the periphery of said carriage, substantially as described.

54. The series of carriers forming a rotary carriage, a trip mechanism moving with each carrier and adjustable to a plurality of operative positions, and a rod or bar moving with each carrier, each rod having operative relation with its trip, in combination with the operative devices of a shingle-machine, substantially as described.

55. In a rotary shingle-machine, the combination of the rim of said machine, two movable spalting track-sections, and mechanism for vertically adjusting said movable track-sections, and retaining them in adjusted position as a basis from which the spalting movement begins, substantially as described.

56. In a shingle-machine, the combination of the rim of the machine, two movable spalting track-sections and means for opening and closing the same, each section supported on a separate post or standard, and suitable mechanism for vertically adjusting said posts, and thereby raising or lowering the track-sections substantially as described.

57. In a shingle-sawing machine, a carriage, a movable dog therein suitably connected to an actuating-rod having an arm extending past said point of connection with the dog, and pivoted thereto, a portion of said rod serving as a stop to limit the swinging movement of the dog.

58. The combination of the carriage, a trip inside the rim thereof movable into position to operate on the spalter, tilter, or similar device, a rod or bar controlling said trip and extending therefrom, a plurality of catches disconnected from the carriage and movable into position to control the trip mechanism, and an abutment or stop intermediate of these catches, in position to restore the trip-controlling train if it be thrown out of normal position by the first catch.

In testimony whereof I affix my signature in presence of two witnesses.

WILLIS J. PERKINS.

Witnesses:
ARTHUR C. DENISON,
HUGH E. WILSON.